(12) United States Patent
Kim et al.

(10) Patent No.: US 11,320,784 B2
(45) Date of Patent: May 3, 2022

(54) METHOD AND APPARATUS FOR PROCESSING HOLOGRAPHIC IMAGE

(71) Applicant: SAMSUNG ELECTRONICS CO., LTD., Suwon-si (KR)

(72) Inventors: Young Kim, Yongin-si (KR); Wontaek Seo, Yongin-si (KR); Jungkwuen An, Suwon-si (KR); Kanghee Won, Seoul (KR); Hongseok Lee, Seoul (KR); Hoon Song, Yongin-si (KR); Chilsung Choi, Suwon-si (KR)

(73) Assignee: SAMSUNG ELECTRONICS CO.. LTD., Suwon-si (KR)

( * ) Notice: Subject to any disclaimer, the term of this patent is extended or adjusted under 35 U.S.C. 154(b) by 223 days.

(21) Appl. No.: 16/717,348

(22) Filed: Dec. 17, 2019

(65) Prior Publication Data

US 2021/0003967 A1  Jan. 7, 2021

(30) Foreign Application Priority Data

Jul. 3, 2019  (KR) .......................... 10-2019-0080316

(51) Int. Cl.
| | | |
|---|---|---|
| *G03H 1/16* | (2006.01) | |
| *G03H 1/08* | (2006.01) | |
| *G03H 1/04* | (2006.01) | |
| *G03H 1/22* | (2006.01) | |

(52) U.S. Cl.
CPC ............. *G03H 1/16* (2013.01); *G03H 1/0402* (2013.01); *G03H 1/0808* (2013.01); *G03H 1/2205* (2013.01); *G03H 2001/0441* (2013.01); *G03H 2001/0825* (2013.01)

(58) Field of Classification Search
None
See application file for complete search history.

(56) References Cited

U.S. PATENT DOCUMENTS

| | | |
|---|---|---|
| 9,619,021 B2 | 4/2017 | Cho et al. |
| 10,175,651 B2 | 1/2019 | Kim et al. |
| 2009/0180165 A1* | 7/2009 | Haussler ................. G03H 1/08 359/9 |
| 2018/0129105 A1 | 5/2018 | Kim et al. |
| 2018/0181065 A1 | 6/2018 | An et al. |
| 2018/0284693 A1 | 10/2018 | Sung et al. |
| 2018/0321426 A1 | 11/2018 | Weinstock et al. |
| 2019/0049732 A1 | 2/2019 | Lee et al. |
| 2019/0113761 A1 | 4/2019 | Kim et al. |

FOREIGN PATENT DOCUMENTS

| | | |
|---|---|---|
| CN | 109387941 A | 2/2019 |
| KR | 10-2015-0068276 A | 6/2015 |
| KR | 10-2018-0007547 A | 1/2018 |
| KR | 10-2018-0074154 A | 7/2018 |

* cited by examiner

*Primary Examiner* — Jennifer D. Carruth
(74) *Attorney, Agent, or Firm* — Sughrue Mion, PLLC

(57) ABSTRACT

Provided are methods of processing a holographic image and apparatuses using the methods. A method includes obtaining image data with respect to a three-dimensional (3D) object, obtaining interference patterns in a computer-generated hologram (CGH) plane by performing a Fourier transform on the image data, and generating a CGH with respect to the 3D object based on the interference patterns, wherein the Fourier transform is performed based on a focal length of an eye lens of an observer.

18 Claims, 6 Drawing Sheets

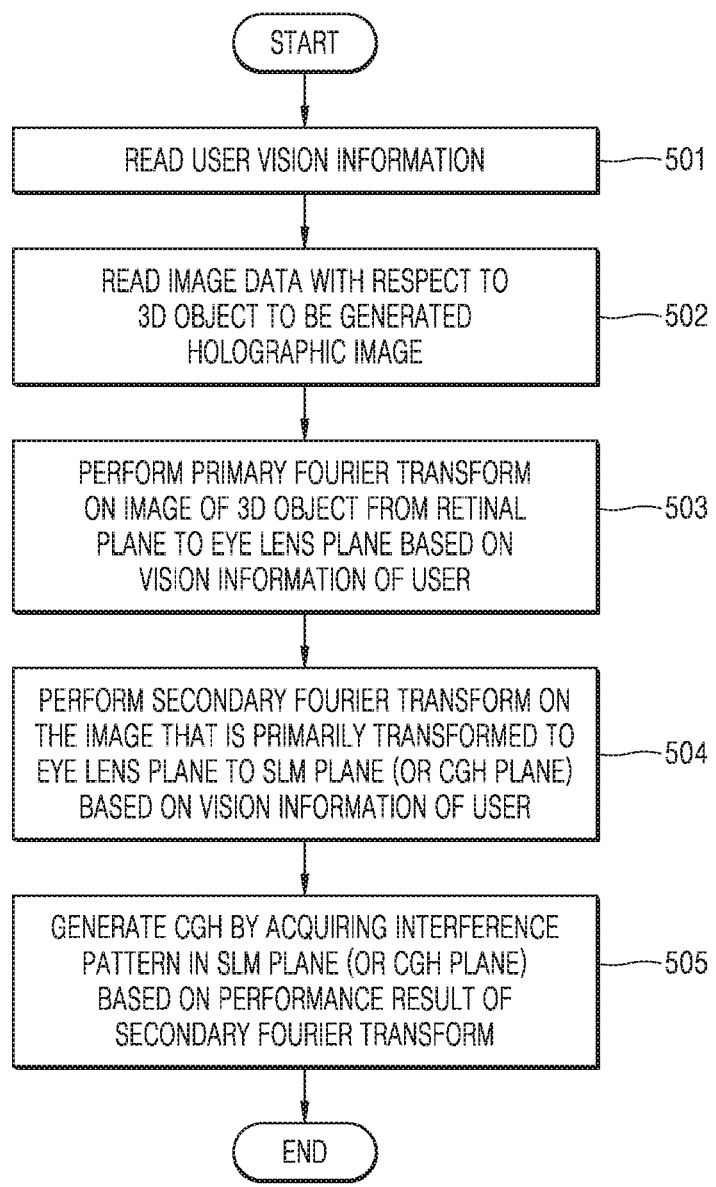

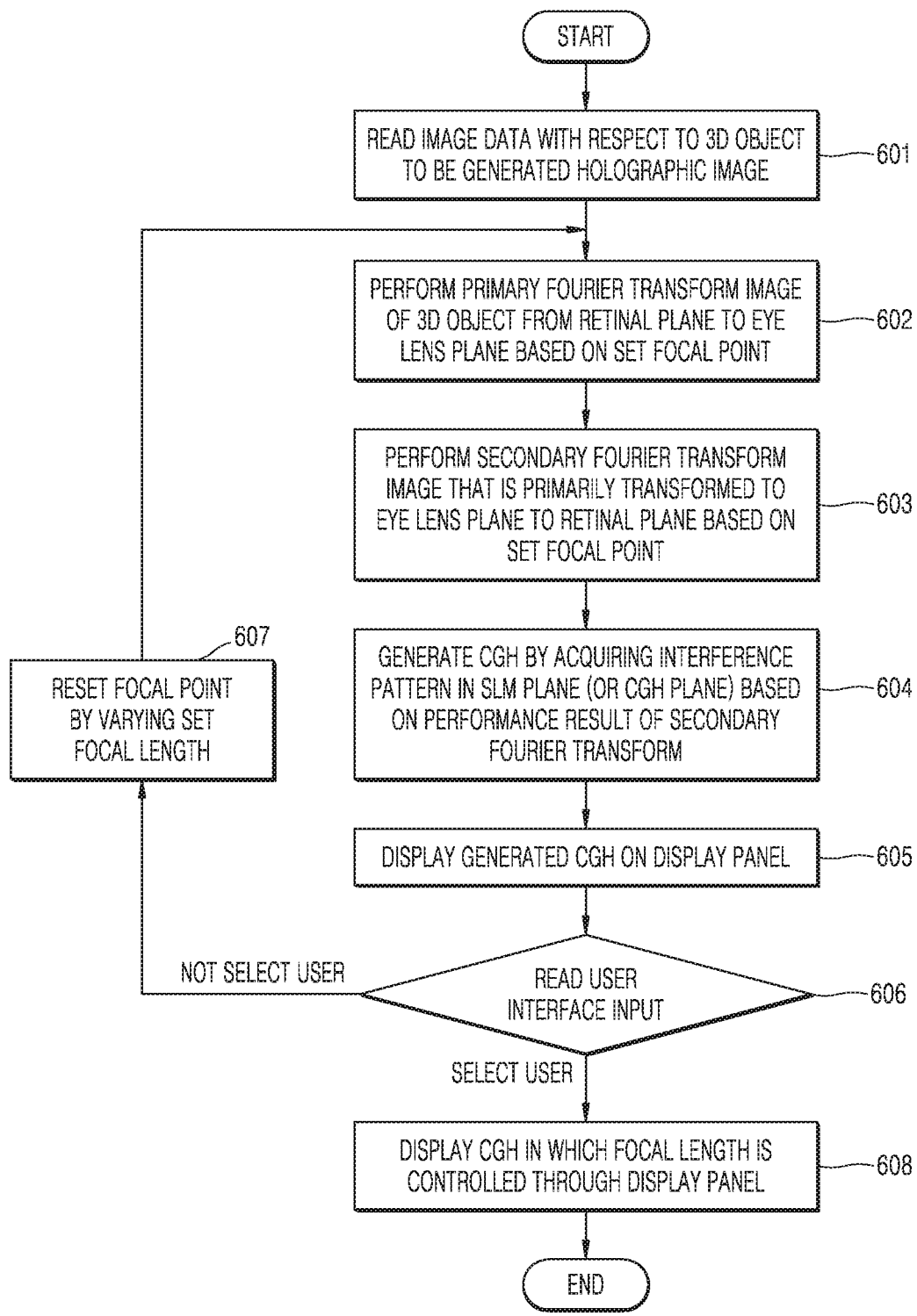

METHOD AND APPARATUS FOR PROCESSING HOLOGRAPHIC IMAGE

CROSS-REFERENCE TO RELATED APPLICATION

This application claims priority to Korean Patent Application No. 10-2019-0080316, filed on Jul. 3, 2019 in the Korean Intellectual Property Office, the disclosure of which is incorporated herein in its entirety by reference.

BACKGROUND

1. Field

Example embodiments of the present disclosure relate to methods and apparatuses for processing a holographic image, and more particularly, to methods and apparatuses for processing computer-generated holograms (CGHs).

2. Description of the Related Art

A hologram is a type of three-dimensional (3D) spatial representation technology that has no limitation of the field of view and little stereoscopic fatigue since an object is reproduced in a 3D space by controlling an amplitude and phase of light. Accordingly, devices that realize high resolution holograms in real time have been developed by using a complex spatial light modulator (SLM) capable of simultaneously controlling the amplitude and phase of light. A hologram may be displayed on a 3D space by using an interference pattern of an object wave and a reference wave. Recently, a computer-generated hologram (CGH) technology has been utilized. The CGH technology may provide a hologram on a flat panel display by processing an interference pattern for reproducing a holographic video. A method of generating digital holograms, for example, a CGH technology, generates holograms by approximating optical signals and calculating interference patterns generated through mathematical operations. A method of generating a digital hologram represents a finished hologram by calculating data that constitute a 3D object based on the fact that the 3D object consists of a collection of various data such as 3D points, polygons, or depth data.

SUMMARY

Example embodiments provide methods and apparatuses for processing a holographic image.

According to an aspect of an example embodiment, there is provided a method of processing a holographic image, the method including obtaining image data with respect to a three-dimensional (3D) object, obtaining interference patterns in a computer-generated hologram (CGH) plane by performing a Fourier transform on the image data, and generating a CGH with respect to the 3D object based on the interference patterns, wherein the Fourier transform is performed based on a focal length of an eye lens of an observer.

The Fourier transform may include a primary Fourier transform for calculating propagation of light waves from a retinal plane to an eye lens plane of the observer, and a secondary Fourier transform for calculating the propagation of light waves from the eye lens plane to the CGH plane based on the focal length of the eye lens of the observer.

The method may further include storing vision information of at least one user in a memory, and reading vision information of a user matching vision information of the observer from the stored vision information of the at least one user.

The vision information of the at least one user may include at least one of a focal length of an eye lens of the at least one user, a refractive power of a lens for correction of the at least one user, a vision of the at least one user, a distance from a retinal plane to the eye lens plane of the at least one user, and a radius of a pupil of the at least one user.

The Fourier transform may be performed based on a distance from a retinal plane to an eye lens plane of the observer and the focal length of the eye lens of the observer.

The method may further include obtaining a distance between an eye lens of the observer and a CGH plane, wherein the Fourier transform is performed based on the distance between the eye lens of the observer and the CGH plane.

The method may further include reconstructing holographic images for each of an increased focal length and a decreased focal length by performing a Fourier transform while increasing or decreasing a focal length of an eye lens, and receiving a command for selecting one of the reconstructed holographic images, wherein the Fourier transform is performed based on the increased focal length or the decreased focal length corresponding to the selected reconstructed holographic image.

The method may further include reconstructing holographic images based on an increase or a decrease in at least one of a focal length and a distance from the retinal plane to an eye lens plane by performing a Fourier transform while increasing or decreasing the at least one of the focal length and the distance from the retinal plane to the eye lens plane, and receiving a command for selecting one of the reconstructed holographic images, wherein the Fourier transform is performed based on the increased at least one of the focal length and the distance from the retinal plane to the eye lens plane or the decreased at least one of the focal length and the distance from the retinal plane to the eye lens plane corresponding to the selected reconstructed holographic image.

The method may further include reconstructing holographic images for each increased or decreased distance between an eye lens of the observer and a CGH plane after performing the Fourier transform while increasing or decreasing the distance between the eye lens of the observer and the CGH plane, and receiving a command for selecting one of the reconstructed holographic images, wherein the Fourier transform is performed based on the increased distance between the eye lens of the observer or the decreased distance between the eye lens of the observer and a CGH plane corresponding to the selected reconstructed holographic image.

According to another aspect of an example embodiment, there is provided a computer-readable recording medium on which a program for executing the method of processing a holographic image on a computer is recorded, the method including obtaining image data with respect to a three-dimensional (3D) object, obtaining interference patterns in a computer-generated hologram (CGH) plane by performing a Fourier transform on the image data, and generating a CGH with respect to the 3D object based on the interference patterns, wherein the Fourier transform is performed based on a focal length of an eye lens of an observer.

According to yet another aspect of an example embodiment, there is provided an apparatus for processing a holographic image, the apparatus including a memory configured to store at least one program, and a processor configured to process a holographic image by executing the at least one program, wherein the processor is configured to obtain image data with respect to a three-dimensional (3D) object, obtain interference patterns in a computer-generated hologram (CGH) plane by performing a Fourier transform on the image data, and generate a CGH with respect to the 3D object based on the interference patterns, wherein the Fourier transform is performed based on a focal length of an eye lens of an observer.

The Fourier transform may include a primary Fourier transform for calculating the propagation of light waves from a retinal plane to the eye lens plane of the observer, and a secondary Fourier transform for calculating the propagation of light waves from the eye lens plane to the CGH plane by reflecting the focal length of the eye lens of the observer.

The memory may be further configured to store vision information of at least one user, and the processor may be further configured to read vision information of a user matching the observer among the stored vision information of the at least one user stored in the memory.

The vision information of the at least one user may include at least one of a focal length of an eye lens of the at least one user, a refractive power of a lens for correction of the at least one user, a vision of the at least one user, a distance from a retinal plane to the eye lens plane of the at least one user, and a radius of a pupil of the at least one user.

The Fourier transform may be performed based on a distance from a retinal plane to an eye lens plane of the observer and a focal length of the eye lens of the observer.

The processor may be further configured to obtain a distance between an eye lens of an observer and a CGH plane, and the Fourier transform may be performed based on the distance between the eye lens of the observer and the CGH plane.

The apparatus for processing a holographic image may further include a display panel configured to display the generated CGH, and a user interface configured to receive a command of the observer.

The display panel may be further configured to display a CGH generated by Fourier transform performed while increasing and decreasing the focal length of the eye lens and reconstructing holographic images for each of increased focal length and the decreased focal length, the user interface may be further configured to receive a command for selecting any one of the reconstructed holographic images, and the processor may be further configured to perform the Fourier transform based on the increased focal length or the decreased focal length corresponding to the selected reconstructed holographic image.

The display panel may be further configured to reconstruct holographic images based on increase or decrease in at least one of a focal length and a distance from the retinal plane to an eye lens plane of the observer by displaying a CGH generated by performing the Fourier transform while increasing or decreasing the at least one of the focal length and the distance from the retinal plane to the eye lens plane, the user interface may be further configured to receive a command for selecting any one of the reconstructed holographic images, and the processor may be further configured to perform the Fourier transform based on the increased at least one of a focal length and a distance between a retinal plane to an eye lens or the decreased at least one of a focal length and a distance between a retinal plane to an eye lens corresponding to the selected reconstructed holographic image.

The display panel may be further configured to reconstruct holographic images for each of increased or decreased distance from an eye lens of an observer to a CGH plane by displaying a CGH generated by performing a Fourier transform while increasing or decreasing the distance between the eye lens of the observer and the CGH plane, the user interface may be further configured to receive a command for selecting any one of the reconstructed holographic images, and the processor may be further configured to perform the Fourier transform based on the increased distance between an eye lens of an observer and a CGH plane or the decreased distance between an eye lens of an observer and a CGH plane corresponding to the selected reconstructed holographic image.

BRIEF DESCRIPTION OF THE DRAWINGS

The above and/or other aspects, features, and advantages of example embodiments will be more apparent from the following description taken in conjunction with the accompanying drawings, in which:

FIG. 5 is a flowchart of a method of processing a holographic image, according to an example embodiment; and FIG. 6 is a flowchart of a method of processing a holographic image, according to an example embodiment.

DETAILED DESCRIPTION

Figure 1:
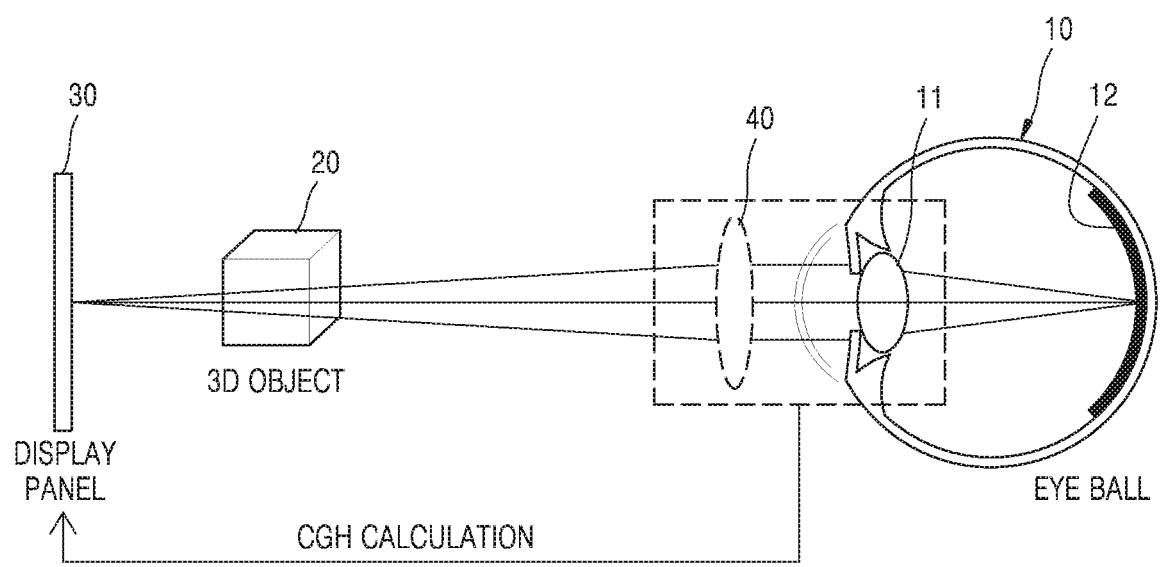
FIG. 1 is a diagram for explaining a processing principle of a CGH according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Terminologies used in the example embodiments are selected as commonly used, but may vary according to the technical intention of ordinary skill in the art, precedents, or a disclosure of a new technology. Also, in particular cases, some terms are arbitrarily selected by the applicant, and in this case, the meanings of the terms will be described in detail at corresponding parts of the specification. Accordingly, the terms used in the specification should be defined not by simply the names of the terms but based on the meaning and contents of the whole specification.

Singular forms are intended to include the plural forms as well, unless the context clearly indicates otherwise. It will be further understood that the term "comprises" or "includes"

should not be construed as necessarily including various constituent elements and various operations described in the specification, and also should not be construed that portions of the constituent elements or operations of the various constituent elements and various operations may not be included or additional constituent elements and operations may further be included.

FIG. 1 is a diagram for explaining a processing principle of a computer-generated hologram (CGH) according to an example embodiment. Referring to FIG. 1, the principle of processing CGH, which is 3D image content for a holographic display, will be briefly described as follows.

An observer may recognize a 3D object 20 in a space through an eye ball 10. The observer may see the 3D object 20 in a space since light reflected from the 3D object 20 is refracted through an eye lens 11 on a front face of the eye ball 10 and focused on a retina 12 on the back side of the eye ball 10. That is, when an anterior focus of the eye lens 11 of the observer is corresponded to the 3D object 20, it may be assumed that an image on the anterior focus has an imaging focus on the retina 12.

Accordingly, when the 3D object 20 is a three-dimensional hologram to be recognized by an observer, a complex light wave field in a display panel 30 may be calculated by inversely propagating an image formed on the retina 12 towards the display panel 30, and thus, a CGH interference pattern for expressing a CGH may be obtained.

The CGH may be classified into a point cloud method, a polygon method, a depth map (or layer-based) method according to a generation method.

In the point cloud method, a surface of an object is expressed with a number of points and an interference pattern at each point is calculated, and thus, a precise depth may be expressed. However, the amount of calculations is greatly increased depending on the number of points.

In the polygon method, a surface of an object is expressed as polygon meshes and an interference pattern at each polygon mesh is calculated, and thus, the amount of calculations is low even though the precision of the object is reduced. The depth map method is a layer-based method and generates a CGH using a 2D intensity image and depth data, and the amount of calculations may be determined according to the resolution of an image.

Because the depth map method is a method of calculating a CGH after approximating a 3D object to multi-depth and modeling, the efficiency of CGH calculation may be higher than that of other methods. Also, a CGH may be generated by using only 2D intensity information and depth information such as a general picture.

When a CGH is generated according to the depth map method, most of the CGH processing is occupied by Fourier transform operations. Fourier transform in a CGH processing is an operation for obtaining a distribution of diffracted images obtained by Fresnel diffraction of an image and corresponds to generalized Fresnel transform (GFT) or Fresnel transform. In the example embodiments, the Fourier transform may include an inverse Fourier transform (iFT), a Fast Fourier transform (FFT), an inverse Fast Fourier transform, GFT, and the like, which are operations using the Fourier transform.

Figure 2:
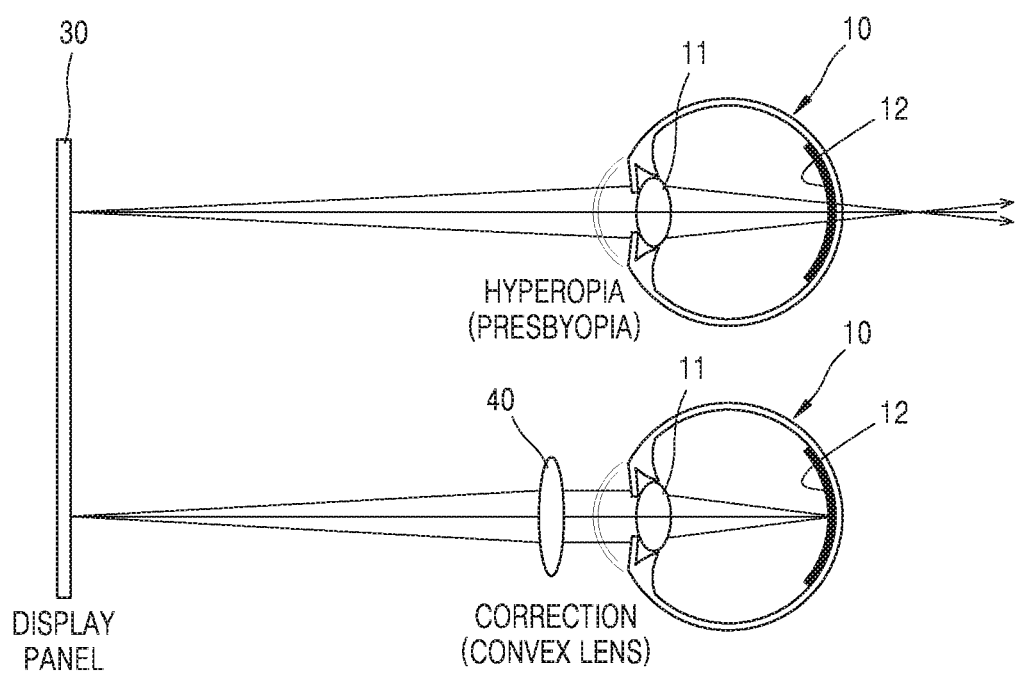
FIG. 2 is a diagram for explaining a principle of vision correction of a user.

FIG. 2 is a diagram for explaining a principle of vision correction of a typical user. Hyperopia or myopia of an observer is caused because of limited ability of muscles to alter a focal length of the lens. Accordingly, as shown in FIG. 2, for example, when an observer has hyperopia, in a naked eye, the eye lens 11 focuses an image with respect to an object beyond the retina 12, and thus, a convex lens as a correction lens 40 is generally used to focus the image with respect to the object on the retina 12. When the observer has myopia, in a naked eye, the eye lens 11 focuses an image with respect to an object before reaching the retina 12, and thus, a concave lens as the correction lens 40 is generally used to focus the image with respect to the object on the retina 12.

Referring to FIG. 1, the method of processing a holographic image according to the example embodiment reflects a vision, for example, a focal length of an eye lens, when a CGH displayed by the display panel 30 is calculated unlike the general vision correction method by using the correction lens 40 described with reference to FIG. 2. In this way, by considering the vision of a viewer, a 3D object, that is, a holographic image, is imaged on the retina 12 of the observer 10 by the display panel 30 without a correction lens such that the convenience of the viewer viewing the holographic image may be improved. In particular, in devices such as a virtual reality (VR) machine, an augmented reality (AR) machine, or a mixed reality (MR) machine, an eye ball of an observer is located close to a display panel. In the case of the related art in which a correction lens is placed in front of the display, a numerical aperture (NA) of a lens has to have an unrealistically large value in order to form an image in the pupil of the eye ball, which may be difficult to implement. On the other hand, the method of processing a holographic image according to the example embodiment enables a viewer to watch a clearer image on the display panel 30 without a corrective lens.

Next, a method of calculating a CGH by reflecting a vision of a viewer, for example, a focal length of a lens, etc. will be described in detail.

Figure 3A:
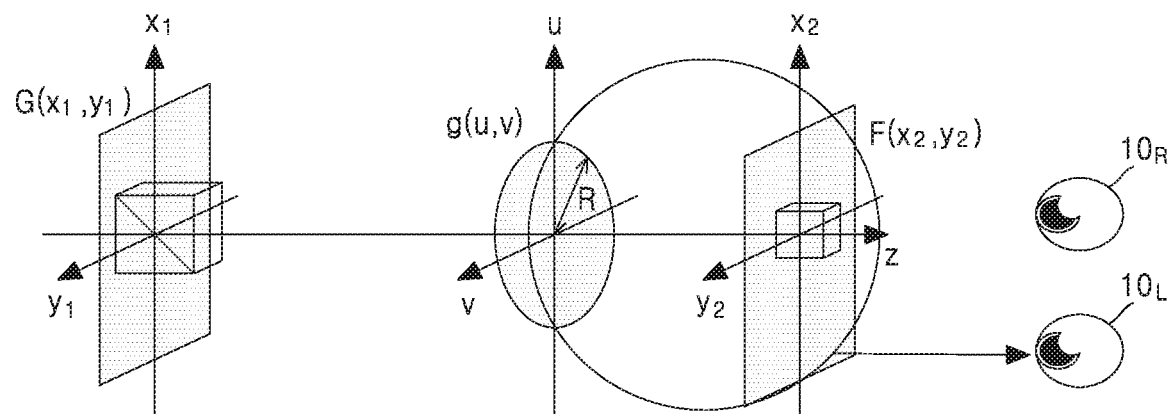
FIG. 3A is a diagram for describing a process of converting input image data according to an example embodiment.
Figure 3B:
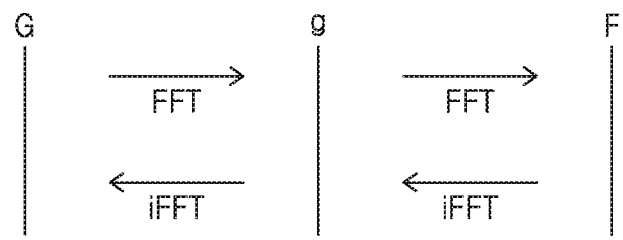
FIG. 3B is a diagram illustrating a Fourier operation process in the process of converting input image data of FIG. 3A.

FIG. 3A is a diagram illustrating a process of converting input image data according to an example embodiment. FIG. 3B is a diagram illustrating a Fourier operation process included in the process of converting input image data of FIG. 3A.

Referring to FIGS. 3A and 3B, (x1, y1) represents a coordinate in a spatial light modulator (SLM) plane. Because a CGH is displayed on a display surface of an SLM 155 (refer to FIG. 4), an SLM plane may be understood as a CGH plane. The coordinate (u, v) is a coordinate of an eye lens plane, and more strictly, a coordinate plane right in front of an eye lens. The coordinate (x2, y2) is a coordinate in a retinal plane of an observer.

When a focus of an eye lens plane of an observer corresponds to a particular depth-layer of a 3D object, an image on the depth-layer may be assumed to have an imaging focus on the retinal plane. Therefore, as shown in Equation 1 below, an image F(x2, y2) formed on a retinal plane is inversely propagated from the observer's retinal plane to the eye lens plane by a primary Fourier transform and, as shown in Equation 2, a focal length of the eye lens is propagated from the eye lens plane to an SLM plane by reflecting a focal length of the eye lens by a secondary Fourier transform). Thus, a complex light wave field at the SLM plane may be calculated, and in this way, a CGH interference pattern for expressing a CGH may be obtained. In the following Equations 1 and 2, ~ is the phase profile.

$$g = \sim iFFT(F) \qquad \text{[Equation 1]}$$

$$G = \sim iFFT(g) \qquad \text{[Equation 2]}$$

Here, FFT may be represented by Equation 3 below.

$$FFT(g) = \int\int g(u, v)e^{-j\frac{\pi}{\lambda d_2}(x_2 u + y_2 v)} du dv \qquad \text{[Equation 3]}$$

According to an example embodiment, a method of generating a CGH of a 3D object by using a depth map method will be described as an example. The depth map method is a method of calculating a CGH after approximating a 3D object to a multi-depth and modeling the multi-depth. According to the depth map method, a space where a hologram is reconstructed may be set to be divided into a predetermined number of depth layers. Here, the number of depth layers may be any number that may be changed according to settings by a user. For example, the number of depth layers may be 256 or another number.

A CGH is calculated via a double stage Fourier transform. The double stage Fourier transform may denote a primary Fourier transform for calculating a propagation of light waves from a retinal plane to an eye lens plane of an observer with respect to an image, that is, a depth image, F(x2, y2) in which a depth layer is in the observer's retinal plane, and a secondary Fourier transform for calculating a propagation of light waves from the eye lens plane to a CGH plane or an SLM plane.

As described above, the Fourier transform in CGH processing is an operation to obtain a distribution of a diffraction image obtained by Fresnel diffraction of the image, which corresponds to a GFT or Fresnel transform. Also, in the example embodiments, the Fourier transform may include iFT, FFT, iFFT, GFT, Fresnel transform, etc. which are operations using the Fourier transform.

For each of the depth images of different depth layers projected on a retinal plane, a primary Fourier transform may be performed to calculate the propagation of light waves from the retinal plane to an eye lens plane. For example, the primary Fourier transform may be embodied by Equation 4 below.

$$g(u, v) = e^{-j\frac{\pi}{\lambda}\left(\frac{1}{d_1} + \frac{1}{d_2} + \frac{1}{f}\right)(u^2 + v^2)} e^{j\frac{\pi}{\lambda d_1}(ux_1 + vy_1)} \qquad \text{[Equation 4]}$$
$$\int\int e^{-j\frac{\pi}{\lambda d_2}(x_2^2 + y_2^2)} F(x_2, y_2) e^{j\frac{\pi}{\lambda d_2}(x_2 u + y_2 v)} dx_2 dy_2$$

Here j is an imaginary unit satisfying $j^2 = -1$, $\lambda$ is the wavelength of light, d1 is a distance between an SLM plane and a front face of a lens, d2 is a distance between a front face of a lens and a retinal plane of an observer, and f is a focal length of a retina of an observer. Referring to Equation 4, it is seen that a phase profile of an eye lens plane is applied, for example, multiplied, to a result of Fourier transform of an image, that is, a depth image, F(x2, y2) in a plane. In this case, it may be seen that a focal length f of an eye lens, the distance d1 between the SLM plane and the front face of the eye lens, and the distance d2 between the front face of an eye lens of an observer and the retinal plane are reflected to the phase profile of the eye lens plane. In the case of a person who has myopia or hyperopia, a focal length f of an eye lens may vary from person to person since muscle control capacity is limited. Accordingly, a focal length f of an eye lens is read or converted from an observer's vision information, and the focal length f is reflected to a phase profile of the eye lens plane. The distance d1 between the SLM plane and the front face of the eye lens may be a value generally expected in a using environment of an observer. However, in some cases, it may be possible to reflect an actual environment to the phase profile by measuring the distance d1 between the SLM plane and the front face of an eye lens, or to allow the observer to select or determine the distance d1. A difference of the distance d2 between the front face of the eye lens and the retinal plane does not vary substantially between people, and thus, a standard value or a representative value may be used. However, embodiments are not limited thereto. For example, the distance d2 between the front face of the lens and the retinal plane may be read from vision information of an observer and the distance d2 may be reflected to the phase profile of the eye lens plane.

Then, a secondary Fourier transform is performed with respect to the primary Fourier transform to calculate propagation of light waves from an eye lens plane to a CGH plane or SLM plane. For example, the secondary Fourier transform may be embodied by Equations 5 and 6 below.

$$G(x_1, y_1) = \frac{1}{(j\lambda d_1)(j\lambda d_2)} e^{j\frac{\pi}{\lambda d_1}(x_1^2 + y_1^2)} iFFT(g) \qquad \text{[Equation 5]}$$

$$iFFT(g) = \qquad \text{[Equation 6]}$$
$$\int\int \left[ e^{-j\frac{\pi}{\lambda}\left(\frac{1}{d_1} + \frac{1}{d_2} + \frac{1}{f}\right)(u^2 + v^2)} e^{j\frac{\pi}{\lambda d_1}(ux_1 + vy_1)} \int\int e^{-j\frac{\pi}{\lambda d_2}(x_2^2 + y_2^2)} \right.$$
$$\left. F(x_2, y_2) e^{j\frac{\pi}{\lambda d_2}(x_2 u + y_2 v)} dx_2 dy_2 \right] du dv$$

Referring to Equations 5 and 6, it may be seen that the secondary Fourier transform is performed by including a phase profile of an eye lens plane to which a focal length f of the eye lens is reflected.

Through the above calculation process, an interference pattern for each of depth images of different depth layers projected on a retinal plane is obtained on the CGH plane or SLM plane.

Figure 4:
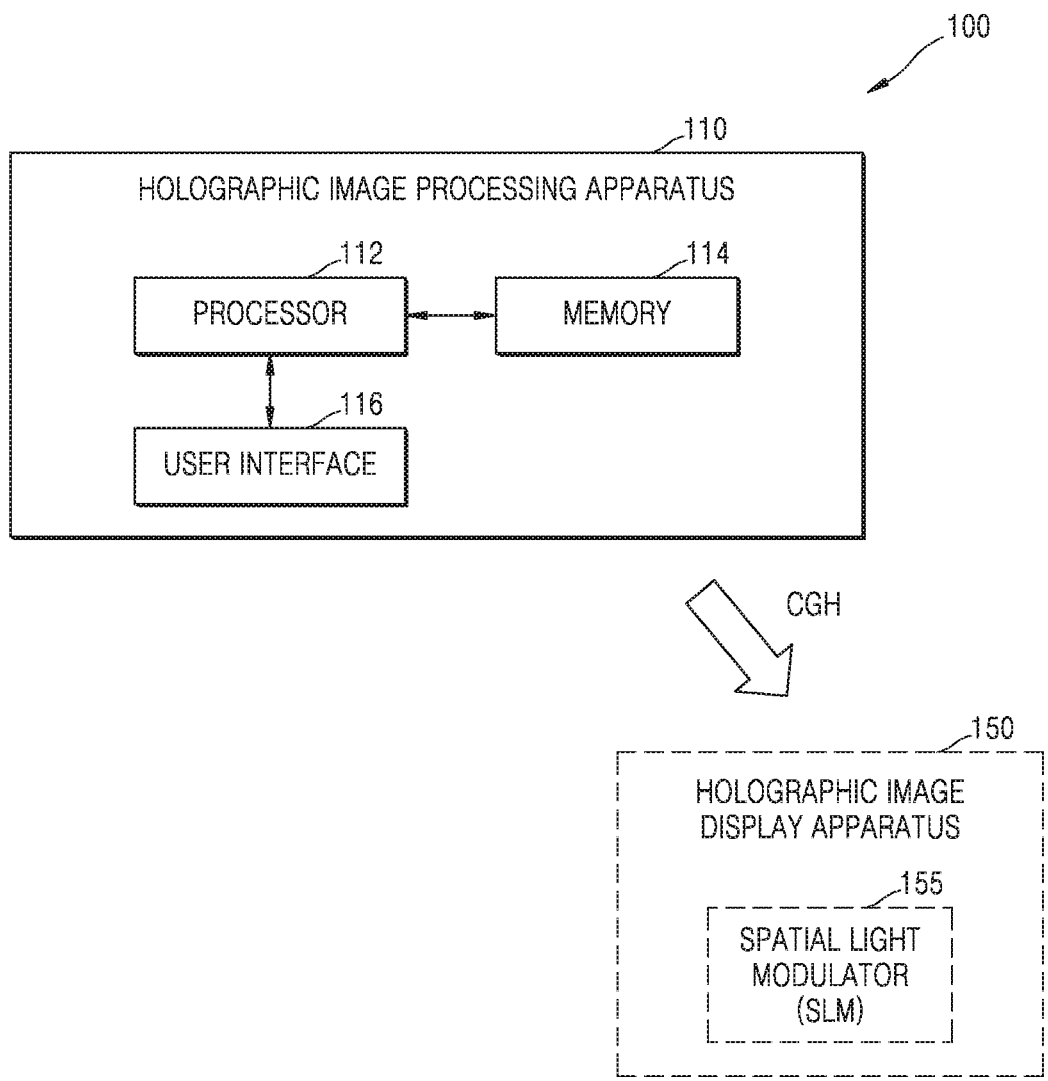
FIG. 4 is a block diagram of a hardware configuration of a holographic image display system according to an example embodiment.

FIG. 4 is a block diagram of a hardware configuration of a holographic image display system 100 according to an example embodiment.

Referring to FIG. 4, the holographic image display system 100 includes an apparatus for processing a holographic image 110 and a display panel 150.

The apparatus for processing a holographic image 110 includes a processor 112, a memory 114, and a user interface 116. The apparatus for processing a holographic image 110 may further include other general purpose components in addition to the components shown in FIG. 4.

The processor 112 may correspond to a processor provided in various kinds of computing devices, such as a personal computer (PC), a server, a television (TV), a mobile device (smartphone, tablet device, etc.), an embedded device, an autonomous vehicle, a wearable device, an AR device, or an Internet of Things (IoT) device. For example, the processor 112 may correspond to a processor, such as a central processing unit (CPU), a graphics processing unit (GPU), an application processor (AP), a neural processing unit (NPU), etc., but is not limited thereto.

The processor 112 performs an overall function for controlling the apparatus for processing a holographic image 110 equipped with the processor 112. The processor 112 may control the apparatus for processing a holographic image 110 as a whole by executing programs stored in the memory 114. For example, when the apparatus for processing a holographic image 110 is provided in a holographic image display apparatus such as a display panel 150, the processor 112 may control the display of a holographic image on the display panel 150 through controlling image processing by the apparatus for processing a holographic image 110.

The processor 112 may include, for example, a controller that generally controls CGH processing operations and a plurality of processing cores that perform Fourier operations, for example, FFT operations. Fourier operations, such as FFT operations correspond to operations that occupy a large portion of the CGH processing operations, and thus, the processor 112 may accelerate the CGH processing through parallel processing of a plurality of processing cores. Each of the plurality of processing cores may be realized by, for example, circuit logic gates in which a shift register, a multiplier, etc. are combined to perform FFT operations. The number of processing cores in the processor 112 may be variously changed considering various factors, such as the performance of the processor 112, the resolution of the display panel (holographic image display apparatus) 150, the image resolution, etc. The plurality of FFT cores may perform FFT operations in parallel to perform a double stage Fourier transform including a primary Fourier transform and a secondary Fourier transform.

The holographic image display apparatus (the display panel) 150 may correspond to a device capable of displaying a holographic image in a 3D space based on a CGH generated by the apparatus for processing a holographic image 110. The holographic image display apparatus 150 may include a hardware module, such as an SLM 155 for reproducing a hologram and may include various kinds of display panels, such as an liquid crystal display (LCD), an organic light-emitting diode (OLED), etc. That is, the holographic image display apparatus 150 may include various hardware modules and hardware configurations for displaying a holographic image in addition to the apparatus for processing a holographic image 110 for generating a CGH. The apparatus for processing a holographic image 110 may be a separate independent device realized outside the holographic image display apparatus 150. In this case, the holographic image display apparatus 150 may receive CGH data generated by the external apparatus for processing a holographic image 110 and may display a holographic image based on the received CGH data. That is, the realization method of the apparatus for processing a holographic image 110 and the display panel 150 is not limited by any one of the embodiments.

The memory 114 is hardware that stores various data processed in the processor 112, for example, the memory 114 may store CGH data processed in the processor 112 and CGH data to be processed. Also, the memory 114 may include vision information of at least one user. The vision information of the user may include at least one of a focal length of an eye lens, a refractive power (diopter) of a lens for correction, a vision of a user, a distance from a retinal plane to an eye lens plane, and a pupil radius.

Furthermore, the memory 114 may store various applications, for example, a hologram playback application, a web browsing application, a game application, a video application, etc. to be driven by the processor 112.

The memory 114 may include at least one of a volatile memory or a nonvolatile memory. The nonvolatile memory includes read only memory (ROM), programmable ROM (PROM), electrically programmable ROM (EPROM), electrically erasable and programmable ROM (EEPROM), a flash memory, phase-change RAM (PRAM), magnetic RAM (MRAM), resistive RAM (RRAM), ferroelectric RAM (FRAM), etc. The volatile memory includes dynamic RAM (DRAM), static RAM (SRAM), synchronous DRAM (SDRAM), PRAM, MRAM, RRAM, FRAM, etc. In the example embodiment, the memory 114 may include a hard disk drive (HDD), a solid state drive (SSD), a compact flash (CF) memory, a secure digital (SD) memory, a micro secure digital (micro-SD) memory, a mini-secure digital (mini-SD) memory, an extreme digital (xD) memory, or a memory stick.

A user interface 116 is a device configured to receive a user's (observer's) command, receive vision information of the user (observer), or display a state of the use of a holographic image display system. As an example embodiment, the user interface 116 may include a physical button, a joggle, a touch screen, etc. Also, the user interface 116 may include a port that performs input/output with an external electronic device.

The processor 112 reads 2D intensity images and depth data with respect to a 3D object from which a holographic image is to be generated. The processor 112 obtains a plurality of depth images of a predetermined resolution with respect to a predetermined number of depth layers from the depth data of the 3D object. The predetermined resolution may be variously changed by a user's settings or an input image format.

The processor 112 calculates a CGH through a double stage Fourier transform. The processor 112 performs a primary Fourier transform on each of depth images of different depth layers projected on a retina plane to calculate the propagation of light waves from a retinal plane to an eye lens plane. The processor 112 may perform a primary Fourier transform, for example, in the same manner as Equation 4 described above. The processor 112 reads a focal length f of an eye lens of an observer from vision information stored in the memory 114. The memory 114 may store a lookup table for converting refractive power (diopter) of a lens for correction or a user's vision to a focal length f of an eye lens. When vision information of an observer stored in the memory 114 is refractive power (diopter) of a lens for correction or a user's vision, a focal length f of an eye lens may be converted from the refractive power (diopter) of the lens for correction or the user's vision by using the lookup table.

The processor 112 may use a value generally expected in an observer's usage environment as a distance d1 between an SLM plane and a front face of an eye lens in a process of primary Fourier transform, or, it may be possible to reflect an actual environment to the phase profile by measuring the distance d1 between the SLM plane and the front face of an eye lens, or to allow the observer to select or determine the distance d1. Also, the processor 112 may use a standard value or a representative value as the distance d2 between a front face of an eye lens and a retinal plane in a primary Fourier transform, or, optionally, the distance d2 between a front face of an eye lens and a retinal plane may be read from the viewer's vision information and the distance d2 may be reflected to a phase profile of the eye lens plane.

The processor 112 performs a secondary Fourier transform with respect to the primary Fourier transform to calculate the propagation of light waves from an eye lens plane to a CGH plane or SLM plane. The processor 112 may perform the secondary Fourier transform, for example, in the same manner as in Equations 5 and 6 as described above. The processor 112 performs the secondary Fourier transform including the phase profile of the eye lens plane to which the focal length f of the eye lens is reflected.

The processor 112 obtains an interference pattern for each of depth images of different depth layers projected on a retinal plane on a CGH plane or SLM plane through the calculation process described above.

FIG. 5 is a flowchart of a method of processing a holographic image according to an example embodiment.

Referring to FIG. 5, since a CGH processing method is related to the example embodiments described with reference to the drawings described above, the descriptions given with respect to the preceding drawings may be applied to the method of FIG. 5.

In operation 501, the processor 112 (FIG. 4) may read user vision information stored in the memory 114 (FIG. 4). When a plurality of users use the holographic image display system, the memory 114 may store at least one user's vision information. In reading user vision information stored in the memory 114, the processor may list at least one user stored in the memory 114 and select at least one user from the listed users. As another example, the memory 114 may store identification information of at least one user, and the holographic image display system may automatically match an observer currently being used in the stored user list by identifying the user through recognition of the identification information of the user. The identification information of the user may include, for example, at least one of a face, a voiceprint, and a fingerprint.

In operation 502, the processor 112 (FIG. 4) reads 2D intensity images and depth data with respect to a 3D object from which a holographic image is to be generated.

In operation 503, the processor 112 performs a primary Fourier transform with respect to an image of the 3D object from a retinal plane to an eye lens plane based on user's vision information.

In operation 504, after the primary Fourier transform, the processor 112 performs a secondary Fourier transform on the image that is primarily transformed into an SLM plane (or a CGH plane) based on user's vision information.

In operation 505, after the secondary Fourier transform, an interference pattern of CGH is obtained based on a result of performing the secondary Fourier transform.

FIG. 6 is a flowchart of a method of processing a holographic image according to an example embodiment.

Referring to FIG. 6, since a CGH processing method is related to the example embodiments described with reference to the drawings described above, the descriptions given with respect to the preceding drawings may be applied to the method of FIG. 6.

In operation 601, the processor 112 (FIG. 4) reads 2D intensity images and depth data with respect to a 3D object from which a holographic image is to be generated.

In operation 602, the processor 112 performs a primary Fourier transform on an image of the 3D object from a retinal plane to an eye lens plane based on a set focal length.

In operation 603, after the primary Fourier transform, the processor 112 performs a secondary Fourier transform on the image that is primarily transformed into the eye lens plane to an SLM plane or a CGH plane based on the set focal length.

In operation 604, after the secondary Fourier transform, a CGH is generated by obtaining an interference pattern in the SLM plane or CGH plane based on the result of performing the secondary Fourier transform.

In operation 605, the generated CGH is displayed on a display panel.

In operation 606, after the CGH is displayed, an observer confirms whether the holographic image for his vision is being reconstructed or not through a user interface.

When the reconstructed holographic image does not fit the observer's own vision, the user may not select the reconstructed holographic image but may reset the focal length by varying, such as increasing or decreasing, a focal length set by a predetermined amount in operation 607, and then operations 602 to 606 may be repeated.

If a holographic image suitable for the observer's own vision is reconstructed, the corresponding holographic image is selected and a CGH with a controlled focus selected is displayed on a display panel in operation 608.

The example embodiment is a case that holographic images corresponding to the increased or decreased focal length are sequentially displayed according to the increase or decrease of the focal length, and an observer selects a holographic image from the sequentially displayed holographic images, but is not limited thereto. As another example embodiment, the holographic images corresponding to the increased and decreased focal lengths may be stored in a memory and may be displayed simultaneously in a thumbnail format to allow an observer to select an optimal holographic image suitable for his or her vision.

The example embodiments may be implemented as a computer-readable recording program and may be realized in general computers that execute the program by using computer-readable recording media. Also, the structure of the data used in the above example embodiments may be recorded on a non-transitory computer-readable recording medium through various means. The computer-readable medium may be magnetic storage media (e.g., ROM, floppy disks, hard disks, etc.) and optical recording media (e.g., CD-ROMs or DVDs), and transmission media such as Internet transmission media.

While example embodiments of a method and apparatus for processing a holographic image have been described in detail with reference to the accompanying drawings, various changes in form and details may be made therein without departing from the spirit and scope as defined by the following claims.

It should be understood that example embodiments described herein should be considered in a descriptive sense only and not for purposes of limitation. Descriptions of features or aspects within each example embodiment should typically be considered as available for other similar features or aspects in other example embodiments. While Example embodiments have been described with reference to the figures, it will be understood by those of ordinary skill in the art that various changes in form and details may be made therein without departing from the spirit and scope as defined by the following claims.

What is claimed is:

1. A method of processing a holographic image, the method comprising:
    obtaining image data with respect to a three-dimensional (3D) object;
    obtaining interference patterns in a computer-generated hologram (CGH) plane by performing a Fourier transform on the image data;
    generating a CGH with respect to the 3D object based on the interference patterns;
    storing vision information of at least one user in a memory; and
    reading vision information of a user matching vision information of an observer from the stored vision information of the at least one user,
    wherein the Fourier transform is performed based on a focal length of an eye lens of the observer.

2. The method of claim 1, wherein the Fourier transform comprises a primary Fourier transform for calculating propagation of light waves from a retinal plane to an eye lens plane of the observer, and a secondary Fourier transform for calculating the propagation of light waves from the eye lens plane to the CGH plane based on the focal length of the eye lens of the observer.

3. The method of claim 1, wherein the vision information of the at least one user comprises at least one of a focal length of an eye lens of the at least one user, a refractive power of a lens for correction of the at least one user, a vision of the at least one user, a distance from a retinal plane to an eye lens plane of the at least one user, and a radius of a pupil of the at least one user.

4. The method of claim 3, wherein the Fourier transform is performed based on a distance from a retinal plane to an eye lens plane of the observer and the focal length of the eye lens of the observer.

5. The method of claim 1, further comprising:
obtaining a distance between the eye lens of the observer and a CGH plane,
wherein the Fourier transform is performed based on the distance between the eye lens of the observer and the CGH plane.

6. The method of claim 1, further comprising:
reconstructing holographic images for each of an increased focal length and a decreased focal length by performing a Fourier transform while increasing or decreasing a focal length of an eye lens; and
receiving a command for selecting one of the reconstructed holographic images,
wherein the Fourier transform is performed based on the increased focal length or the decreased focal length corresponding to the selected reconstructed holographic image.

7. The method of claim 1, further comprising:
reconstructing holographic images based on an increase or a decrease in at least one of a focal length and a distance from a retinal plane to an eye lens plane by performing a Fourier transform while increasing or decreasing the at least one of the focal length and the distance from the retinal plane to the eye lens plane; and
receiving a command for selecting one of the reconstructed holographic images,
wherein the Fourier transform is performed based on the increased at least one of the focal length and the distance from the retinal plane to the eye lens plane or the decreased at least one of the focal length and the distance from the retinal plane to the eye lens plane corresponding to the selected reconstructed holographic image.

8. The method of claim 1, further comprising:
reconstructing holographic images for each increased or decreased distance between the eye lens of the observer and a CGH plane after performing the Fourier transform while increasing or decreasing the distance between the eye lens of the observer and the CGH plane; and
receiving a command for selecting one of the reconstructed holographic images,
wherein the Fourier transform is performed based on the increased distance between the eye lens of the observer or the decreased distance between the eye lens of the observer and a CGH plane corresponding to the selected reconstructed holographic image.

9. A computer-readable recording medium on which a program for executing a method of processing a holographic image on a computer is recorded, the method comprising:

obtaining image data with respect to a three-dimensional (3D) object;
obtaining interference patterns in a computer-generated hologram (CGH) plane by performing a Fourier transform on the image data;
generating a CGH with respect to the 3D object based on the interference patterns;
reconstructing holographic images for each of an increased focal length and a decreased focal length by performing a Fourier transform while increasing or decreasing a focal length of an eye lens; and
receiving a command for selecting one of the reconstructed holographic images,
wherein the Fourier transform is performed based on a focal length of an eye lens of an observer, and
wherein the Fourier transform is performed based on the increased focal length or the decreased focal length corresponding to the selected reconstructed holographic image.

10. An apparatus for processing a holographic image, the apparatus comprising:
a memory configured to store at least one program and store vision information of at least one user; and
a processor configured to process a holographic image by executing the at least one program,
wherein the processor is configured to:
obtain image data with respect to a three-dimensional (3D) object,
obtain interference patterns in a computer-generated hologram (CGH) plane by performing a Fourier transform on the image data, and
generate a CGH with respect to the 3D object based on the interference patterns,
wherein the Fourier transform is performed based on a focal length of an eye lens of an observer, and
wherein the processor is further configured to read vision information of a user matching the observer among the stored vision information of the at least one user stored in the memory.

11. The apparatus for processing a holographic image of claim 10, wherein the Fourier transform comprises a primary Fourier transform for calculating propagation of light waves from a retinal plane to an eye lens plane of the observer, and a secondary Fourier transform for calculating the propagation of light waves from the eye lens plane to the CGH plane by reflecting the focal length of the eye lens of the observer.

12. The apparatus for processing a holographic image of claim 10, wherein the vision information of the at least one user comprises at least one of a focal length of an eye lens of the at least one user, a refractive power of a lens for correction of the at least one user, a vision of the at least one user, a distance from a retinal plane to an eye lens plane of the at least one user, and a radius of a pupil of the at least one user.

13. The apparatus for processing a holographic image of claim 12, wherein the Fourier transform is performed based on a distance from a retinal plane to an eye lens plane of the observer and a focal length of the eye lens of the observer.

14. The apparatus for processing a holographic image of claim 10, wherein the processor is further configured to obtain a distance between the eye lens of the observer and a CGH plane, and
wherein the Fourier transform is performed based on the distance between the eye lens of the observer and the CGH plane.

15. The apparatus for processing a holographic image of claim 10, further comprising:
a display panel configured to display the generated CGH; and
a user interface configured to receive a command of the observer.

16. The apparatus for processing a holographic image of claim 15, wherein the display panel is further configured to display a CGH generated by Fourier transform performed while increasing and decreasing the focal length of the eye lens and reconstructing holographic images for each of increased focal length and the decreased focal length,
wherein the user interface is further configured to receive a command for selecting any one of the reconstructed holographic images, and
wherein the processor is further configured to perform the Fourier transform based on the increased focal length or the decreased focal length corresponding to the selected reconstructed holographic image.

17. The apparatus for processing a holographic image of claim 15, wherein the display panel is further configured to reconstruct holographic images based on increase or decrease in at least one of a focal length and a distance from the retinal plane to an eye lens plane of the observer by displaying a CGH generated by performing the Fourier transform while increasing or decreasing the at least one of the focal length and the distance from the retinal plane to the eye lens plane,
wherein the user interface is further configured to receive a command for selecting any one of the reconstructed holographic images, and
wherein the processor is further configured to perform the Fourier transform based on the increased at least one of a focal length and a distance between a retinal plane to an eye lens or the decreased at least one of a focal length and a distance between a retinal plane to an eye lens corresponding to the selected reconstructed holographic image.

18. The apparatus for processing a holographic image of claim 15, wherein the display panel is further configured to reconstruct holographic images for each of increased or decreased distance from the eye lens of the observer to a CGH plane by displaying a CGH generated by performing a Fourier transform while increasing or decreasing the distance between the eye lens of the observer and the CGH plane,
wherein the user interface is further configured to receive a command for selecting any one of the reconstructed holographic images, and
wherein the processor is further configured to perform the Fourier transform based on an the increased distance between the eye lens of the observer and a CGH plane or the decreased distance between the eye lens of the observer and a CGH plane corresponding to the selected reconstructed holographic image.

* * * * *